United States Patent [19]

Rhue et al.

[11] Patent Number: 5,021,297

[45] Date of Patent: Jun. 4, 1991

[54] PROCESS FOR COATING PLASTIC SUBSTRATES WITH POWDER COATING COMPOSITIONS

[75] Inventors: Frederick F. Rhue, Natrona Heights, Pa.; William D. Franks, Medina; Gary C. Craig, Fairview Park, both of Ohio

[73] Assignee: PPG Industries, Inc., Pittsburgh, Pa.

[21] Appl. No.: 279,464

[22] Filed: Dec. 2, 1988

[51] Int. Cl.$^5$ .............................................. B05D 3/00
[52] U.S. Cl. .................................... 428/430; 427/185; 427/195; 427/316
[58] Field of Search ................... 427/185, 195, 316; 428/430

[56] References Cited

U.S. PATENT DOCUMENTS

| | | | |
|---|---|---|---|
| 3,106,769 | 10/1963 | Goethe et al. | 427/185 |
| 3,183,113 | 5/1965 | Gemmer | 427/185 |
| 3,226,245 | 12/1965 | Dettling et al. | 427/185 |
| 3,240,744 | 3/1966 | Kusiak | 427/185 |
| 3,388,185 | 6/1968 | Goldberg et al. | 427/185 |
| 3,617,327 | 11/1971 | Daniel | 118/400 |
| 3,953,644 | 4/1976 | Camelon et al. | 428/220 |
| 4,076,788 | 2/1978 | Ditto | 264/255 |
| 4,220,675 | 9/1980 | Imazaki | 427/27 |
| 4,263,352 | 4/1981 | Kaltenbach et al. | 427/379 |
| 4,323,600 | 4/1982 | Sakata et al. | 427/202 |
| 4,348,248 | 9/1982 | Poncet | 156/276 |
| 4,402,983 | 9/1983 | Craven | 428/335 |
| 4,412,034 | 10/1983 | Meyer et al. | 427/195 |
| 4,680,139 | 7/1987 | Williams | 252/511 |
| 4,737,403 | 4/1988 | Simpson | 428/273 |
| 4,806,388 | 2/1989 | Mochizuki et al. | 427/46 |

FOREIGN PATENT DOCUMENTS 57-181822  11/1982  Japan .

Primary Examiner—Shrive Beck
Attorney, Agent, or Firm—William J. Uhl

[57] ABSTRACT

A method of coating plastic substrates susceptible to gassing with a powder coating composition is disclosed. The method is effective in sealing the substrate against popping.

14 Claims, No Drawings

PROCESS FOR COATING PLASTIC SUBSTRATES WITH POWDER COATING COMPOSITIONS

FIELD OF THE INVENTION

The present invention relates to a method of coating a plastic substrate, more particularly, to a method of coating a fiber-reinforced plastic substrate with a powder coating composition to seal the substrate against gassing.

BACKGROUND OF THE INVENTION

Plastics are becoming increasingly important in the construction of automobiles, trucks and off-the-road vehicles. The materials most commonly used are resins, such as polyesters, epoxies and phenolics, which are often reinforced with fibers, particularly glass fibers. Typically, a mixture of resins and fibers is formed into a mass called bulk molding compound (BMC) or a sheet called sheet molding compound (SMC). SMC or BMC is then compression molded to form the desired part.

Plastic parts have many advantages. They are strong, lightweight and will not rust. However, they also have some serious disadvantages, e.g., it is difficult to obtain finish coatings with excellent appearance on the plastic parts. A particularly troublesome appearance problem is "popping" which is an eruption in the coating which develops during the heat curing cycle of the finish coating.

Plastic parts, particularly of the fiber glass-reinforced polyester type, are known to be porous and to contain entrapped air and other volatile materials. These volatile materials are believed to release during the curing cycle of subsequently applied coatings and burst through the coating as it is curing. Primers can be applied to fiber glass-reinforced plastic parts for the purpose of sealing off its porosity. However, it has been found that many of the commercially available primers are simply not effective sealers in that popping still occurs in a subsequently applied finish coat during its curing cycle.

SUMMARY OF THE INVENTION

In accordance with the present invention, a method of coating a plastic substrate is provided. The method comprises:
(a) preheating the substrate at a temperature and for a time sufficient to degas the substrate; the temperature being above the temperature sufficient to cure a subsequently applied powder coating composition;
(b) applying immediately a powder coating composition to the preheated substrate above the temperature sufficient to cure the powder coating composition; and
(c) heating immediately the coated substrate at a temperature and for a time sufficient to cure the powder coating composition.

The invention also provides for articles coated by the method of the invention.

DETAILED DESCRIPTION

The powder coating composition which can be used in the method of the invention can be any of the various powder coating compositions known in the art such as thermosetting powder coating compositions. Examples include epoxy resin powder coatings, polyester powder coatings and acrylic resin powder coatings.

Examples of thermosetting epoxy resin powder coating compositions are those based on epoxy group-containing acrylic polymers and polyacid curing agents. These powder coating compositions are preferred because they provide the best coating appearance and reduced popping. Examples of polyacid curing agents are saturated aliphatic dicarboxylic acids containing from 4 to 24 carbon atoms. Specific examples of these powder coating compositions are disclosed in Reissue Patent No. 32,261.

Examples of thermosetting polyester powder coating compositions are acid group-containing polyesters in combination with triglycidyl isocyanurate curing agents. These products are commercially available. For example, the carboxylic acid group-containing polyesters are available from Ciba-Geigy as ARALDITE 3010 and 3001 and from Dutch State Mines as URALAC P3600. Triglycidyl isocyanurate curing agent is available from Ciba-Geigy as PT810.

Examples of thermosetting acrylic powder coating compositions are acid group-containing acrylic polymers in combination with an aliphatic dicarboxylic acid containing from 4 to 20 carbon atoms per molecule and/or a polymeric polyanhydride and a beta-hydroxyalkylamide crosslinking agent. Specific examples of these powder coating compositions are described in U.S. Pat. No. 4,727,111.

A particularly preferred thermosetting powder coating composition for smoothness and reduced popping is one based on an epoxy group-containing acrylic polymer and a polyol-modified polyanhydride curing agent such as poly(dodecanedioic) anhydride reacted with trimethylolpropane in an OH/anhydride equivalent ratio of 0.3 to 0.6/1. Such a product contains a mixture of carboxylic acid groups and anhydride groups. Such powder coating compositions are described in U.S. patent application Ser. No. 74,105, filed July 16, 1987.

Besides the main resinous film-forming ingredients in the powder coating composition described above, the powder coating composition contains other optional ingredients well known in the art of powder coating compositions. Examples of these other ingredients are pigments, flow control agents, UV absorbing agents and anti-oxidants. These optional ingredients are described in U.S. Pat. No. 4,727,111 mentioned above.

In addition, the powder coating composition may include fumed silica or the like as a powder flow additive to reduce caking of the powder during storage. An example of fumed silica is sold by Cabot Corporate under the trademark CAB-O-SIL ®. The powder flow additive when used is generally present in amounts ranging from about 0.1 to about 0.5 percent by weight based on the total weight of the powder coating composition. The powder flow additive is generally added to the particulate powder coating composition after preparation of the particulate mixture.

The powder coating compositions are prepared by melt blending the various ingredients. This can be accomplished by first blending in a high shear or high intensity dry mixer, e.g., a Welex mixer, and then melt blending the mixture in an extruder at a temperature of from about 80° C. to about 130° C. The extrudate is then cooled and pulverized into a powder.

The plastic substrates which are coated in accordance with the present invention are preformed plastic substrates such as the compression molded fiber glass-reinforced polyester type which are known in the art as bulk molding compounds (BMC) or sheet molding compounds (SMC). Such compositions are described in numerous publications and patents including the annually published *Modern Plastics Encyclopedia*, the *Encyclopedia of Chemical Technology*, Kirk-Othmer, 2nd Edition, Vol. 20, pages 791-839, Interscience, 1969, as well as U.S. Pat. No. 3,184,527. It is believed, however, that the process is useful with other compression and injection molded plastics both thermosetting and thermoplastic type such as phenolics including phenolic-cellulose composites, silicones, aminoplast, polyurethanes, polystyrene, polypropylene, thermoplastic acrylics, polyvinyl chloride and various polymers and copolymers of acrylonitrile and butadiene with and without fiber reinforcement as long as the plastic is susceptible to gassing upon heating. Also, when fiber reinforcement is used, fibers other than glass fibers such as boron fibers may be used.

The process of the invention is carried out by first preheating the plastic substrate at a temperature and for a time sufficient to degas the substrate and at a temperature above that sufficient to cure a subsequently applied powder coating composition. The times and temperatures for this preheating step will vary somewhat depending on the identity of the substrate and the powder coating compositions. Typically, the temperature will be at least 300° F. (149° C.), usually 300° F. (149° C.) to 400° F. (204° C.), preferably 325° F. (163° C.) to 400° F. (204° C.), and the preheating time typically will be at least 15 minutes, usually from 15 minutes to 1 hour.

After the preheating step, the powder coating composition is immediately (i.e., before the substrate cools below the curing temperature of the powder coating composition) applied to the preheated substrate. The powder coating compositions can be applied to the plastic substrate by any of the conventional powder coating techniques, such as fluidized bed and spraying, preferably electrostatic spraying. The powder coating composition can be applied in one pass or in several passes to provide a total film thickness of at least 1 mil, preferably from about 3 to about 6 mils, and more preferably from 4 to 5 mils.

For electrostatic spraying, the plastic substrate must be made electroconductive such as by impregnating the substrate with graphite particles or by using electrically conductive fiber reinforcement.

Optionally, a conductive primer or a conductive wash solution can be applied to the plastic substrate prior to preheating. By use of a conductive primer or wash solution and electrostatic spraying, more uniformly coated articles can be obtained. The use of a conductive primer or wash solution is preferred for use with non-uniformly sized parts. An example of a conductive primer is that available from Sherwin Williams Co. as POLANE. An example of a conductive wash solution is that available from American Cyanamid Co. as CYAST 609.

After the powder coating composition has been applied, the coated substrate is then heated immediately (i.e., before the substrate cools below the curing temperature of the powder coating composition) at a temperature and for a time sufficient to cure the powder coating composition. At no time during the coating process should the temperature of the substrate be allowed to drop below the curing temperature of the powder coating composition. For thermosetting coatings, cure can be measured by the solvent resistance of the coating. Typically, the cured thermosetting coating will withstand at least 50 xylene double rubs without rubbing through to the substrate. A double rub is a rub back and forth with a xylene-saturated cloth using normal hand-applied pressure.

The curing times and temperatures will vary somewhat depending on the powder coating composition. Typically, the curing temperatures will be at least 250° F. (121° C.), usually 250° F. (121° C.) to 375° F. (191° C.) preferably 300° F. (149° C.) to 375° F. (191° C.) for at least 15 minutes, usually from 15 minutes to 1 hour.

The coating process described above can be accomplished in an automated manner with the substrate to be coated passing on an overhead conveyor to a preheating area to degas the substrate followed by passing to a painting station for application of the powder coating composition and then to a baking oven to cure the coating and seal the substrate.

After baking, a finish coat can optionally be applied to the cured powder coating. However, the powder coating itself can be the finish coat. More normally, however, the powder coating composition is used as a primer-sealer for a subsequently applied finish coat. The finish coat can be any of the compositions known in the art for automotive and industrial applications. These compositions typically include a resinous binder and a pigment. Particularly useful resinous binders are acrylic polymers, polyesters, including alkyds and polyurethanes.

Pigments useful in the finish coat include color pigments normally used in automotive and industrial applications such as titanium dioxide, iron oxide, chromium oxide, lead chromate and carbon black, and organic pigments such as phthalocyanine blue and phthalocyanine green. If desired, metallic pigments such as aluminum flake and metal oxide and metal oxide coated micas can also be used in the finishing coat. The finishing coat may additionally contain other materials such as flow control agents, antioxidants, UV light absorbers and the like.

The finish coats can be applied to the cured powder coating by conventional means such as brushing, spraying, flow coating and the like but they are most often applied by spraying. The usual spray techniques and equipment for air spraying or electrostatic spraying in either manual or automatic methods can be used.

After application of any finish coat to the cured powder coating, it is heated to coalesce and cure the finish coat. Typically, heating at from 180° F. to 325° F. (82° C. to 163° C.) for about 15 to about 60 minutes is sufficient depending upon the resinous vehicle. Film thicknesses for the finish coat are typically from about 1 to about 5 mils.

The finish coat can be applied as a one-coat system or alternatively can be applied as a so-called color-clear system in which a pigmented or colored basecoat is first applied to the cured powder coating followed by the application of a clear topcoat over the colored basecoat. Such systems are being increasingly used in the automotive industry since they provide for excellent depth of color in the underlying basecoat as well as outstanding gloss, distinctness of image and durability in the coating.

The invention is illustrated by reference to the following examples wherein parts refers to parts by weight unless otherwise indicated.

EXAMPLES

The examples show the preparation of a thermosetting powder coating composition and application of the composition to an SMC substrate by the process of the present invention (Example A). For the purpose of comparison, the same powder coating composition was applied to an SMC substrate in a manner outside the scope of the invention. In one comparison (Example B), the fiber-reinforced plastic substrate was preheated above the curing temperature of the powder coating composition but then cooled to below the curing temperature prior to applying the powder coating composition. In another comparison (Example C), the fiber-reinforced plastic substrate was preheated above the curing temperature of the powder coating composition; the thermosetting powder coating composition applied to the preheated substrate at above the curing temperature of the powder coating composition but the coated substrate was then cooled at room temperature for 30 minutes before further heating to cure the powder coating. The coated SMC substrates after curing were topcoated with an automotive topcoating composition and the top coat cured by heating. The coated substrates were then evaluated for popping through the top coat.

A powder coating composition (PCC 80100) was prepared from the following ingredients:

| Inredients | Parts by Weight |
|---|---|
| Epoxy-functional acrylic resin[1] | 68.0 |
| Poly(dodecanedioic anhydride)[2] | 20.0 |
| IRGANOX 1076[3] | 1.0 |
| MODAFLOW II[4] | 1.0 |
| Benzoin | 1.0 |
| Titanium dioxide | 8.98 |
| Carbon black | 0.02 |

[1] A reaction vessel including a stirring means and initially charged with 536.0 g xylene was heated to reflux to remove water through a Dean-Stark trap. A first feed including 896.5 g glycidyl methacrylate, 896.3 g methyl methacrylate, 224.2 g butyl acrylate and 224.2 g styrene, and a second feed including 384.7 g xylene and 112.0 g VAZO 67 (alpha, alpha'-dimethylazobis(isobutyronitrile) available from E. I. Du Pont de Nemours and Co.) were added simultaneously over three hours while maintaining the reaction mixture at reflux. A third feed including 20.6 g xylene and 9.0 g VAZO 67 was then added over one hour while maintaining the reaction mixture at reflux. Finally, a fourth feed including 20.0 g xylene and 9.0 g VAZO 67 was added over 1¼ hours while maintaining the reaction mixture at reflux. The resultant reaction mixture was vacuum stripped to 100 percent solids.
[2] A reaction vessel was charged with 2070 g of dodecanedioic acid and 612 g of acetic anhydride and heated to 125° C. under a nitrogen atmosphere. After two hours at 125° C., the reaction mixture was vacuum stripped to 100 percent solids, followed by addition of 98.1 g trimethylolpropane. The reaction mixture was held at reflux (130–134° C.) for one hour and then cooled. The resultant product was 100 percent solids and had an acid value of about 440.
[3] Anti-oxidant from Ciba-Geigy Co.
[4] Flow control agent available from Monsanto Co.

The ingredients were first blended in a Welex mixer for about two minutes, then melt blended in a Baker Perkins Twin Screw Extruder at 110° C., chilled on a chill roll at 20° C., flaked and then ground in a micromill and sieved through a 200-mesh screen.

EXAMPLE A

Five (5) 12 inch by 12 inch high porosity SMC panels (PHASE ALPHA from Ashland Chemical Co.) were preheated in an oven for 30 minutes at 375° F. (191° C. to degas the substrate. The preheated panels were immediately passed to a painting station and spray primed with 4.0–4.5 mils of the thermosetting powder coating composition described above. The primed substrates were immediately passed to a baking oven and baked for 30 minutes at 325° F. (163° C.) to cure the coating. The coated substrates were then cooled to room temperature.

An automotive quality top coat composition was applied to the cured primer. The top coat composition was a color-clear system in which the color coat was red HUBC 72693 (polyester-acrylic-melamine) and the clear coat was DCT-2000 (polyester-acrylic-melamine), both available from PPG Industries, Inc. The base coat was spray applied to the primer coat, given an air flash at ambient temperature for about 2 minutes and then the clear coat was spray applied to the base coat. The composite coating was then heated at 250° F. (121° C.) for 30 minutes to cure the top coat. The coated panels were then evaluated for popping through the top coat and the average pops per panel were recorded. The results are reported in the Table below.

EXAMPLE B

The procedure of Example A was repeated with the exception that after the preheating step, the substrate was cooled to 200° F. (93° C.) prior to priming with the thermosetting powder coating composition. The popping evaluation is reported in the Table below.

EXAMPLE C

The procedure of Example A was repeated with the exception that after the priming step the substrate was cooled for 30 minutes at room temperature (20°–23° C.) before passing to the baking oven for cure. The popping evaluation is reported in the Table below.

TABLE

Evaluation of Coated Panels of Examples A, B and C for Popping

| Example | Average Pops per Coated Panels |
|---|---|
| A | 0 |
| B | 5.4 |
| C | 36 |

The results indicate that the method of the invention (Example A) is the best method for effectively sealing porosity of the SMC substrate. It is critical that once degassed, the plastic substrate must not be allowed to cool below the powder coating cure temperature until the powder coating is actually cured.

We claim:

1. A process of coating a preformed fiber-reinforced plastic substrate susceptible to gassing upon heating comprising:
   (a) preheating the substrate at temperatures and for time sufficient to degas the substrate, said temperatures above the temperature sufficient to cure a subsequently applied thermosetting powder coating composition;
   (b) applying immediately a thermosetting powder coating composition to the preheated substrate above the temperature sufficient to cure the thermosetting powder coating composition; and
   (c) heating immediately the coated substrate at a temperature and for a time sufficient to cure the thermosetting powder coating composition.

2. The process of claim 1 in which the fiber-reinforced plastic substrate is a fiber glass-reinforced polyester substrate.

3. The process of claim 1 in which the substrate is preheated at 300° F. (149° C.) to 400° F. (204° C.) for at least 15 minutes.

4. The process of claim 1 in which the thermosetting powder coating composition is based on an epoxy-containing acrylic polymer and a polyacid curing agent.

5. The process of claim 1 in which the thermosetting powder coating composition is applied at a thickness of about 3 to 6 mils.

6. The process of claim 1 in which the coated substrate is heated at 250° F. (121° C.) to 375° F. (191° C.) for at least 15 minutes.

7. The process of claim 1 in which the coated substrate is subsequently topcoated with a finish coat.

8. The process of claim 7 in which the finish coat is cured by heating.

9. An article coated by the method of claim 7.

10. An article coated by the method of claim 1.

11. A process of coating a preformed glass fiber-reinforced polyester substrate susceptible to gassing upon heating comprising:
    (a) preheating the substrate at a temperature of at least 300° F. (149° C.) for at least 15 minutes to degas the substrate, said temperature being above the temperature sufficient to cure a subsequently applied thermosetting powder coating composition;
    (b) applying immediately a thermosetting powder coating composition at a thickness of from 3 to 6 mils to the preheated substrate above the temperature sufficient to cure the thermosetting powder coating composition; and
    (c) heating at a temperature of at least 250° F. (121° C.) for at least 15 minutes until the powder coating composition is cured.

12. The process of claim 11 in which the thermosetting powder coating composition is based on an epoxy-containing acrylic polymer and a polyacid curing agent.

13. The process of claim 11 in which the coated substrate is subsequently topcoated with a finish coat and the finish coat cured by heating.

14. An article coated by the method of claim 13.

* * * * *